(12) United States Patent
Bales et al.

(10) Patent No.: US 11,887,021 B1
(45) Date of Patent: Jan. 30, 2024

(54) PREDICTIVE PACKAGING SYSTEM

(71) Applicant: Amazon Technologies, Inc., Seattle, WA (US)

(72) Inventors: Matthew J. Bales, Shoreline, WA (US); Kimberly Sue Houchens, Seattle, WA (US); Ralph Giovanni Caprio, Seattle, WA (US); Homer Strong, Seattle, WA (US); Nicola Preli, Seattle, WA (US); Michael Hodgkinson, Cardiff (GB)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 16/802,876

(22) Filed: Feb. 27, 2020

Related U.S. Application Data

(60) Provisional application No. 62/942,011, filed on Nov. 29, 2019.

(51) Int. Cl.
| | |
|---|---|
| *G06Q 50/28* | (2012.01) |
| *G06N 20/00* | (2019.01) |
| *G06N 5/04* | (2023.01) |
| *G06Q 10/04* | (2023.01) |
| *G06F 16/24* | (2019.01) |
| *G06Q 10/0631* | (2023.01) |
| *G06F 16/23* | (2019.01) |

(52) U.S. Cl.
CPC ......... *G06Q 50/28* (2013.01); *G06F 16/2379* (2019.01); *G06F 16/24* (2019.01); *G06N 5/04* (2013.01); *G06N 20/00* (2019.01); *G06Q 10/043* (2013.01); *G06Q 10/06315* (2013.01)

(58) Field of Classification Search
CPC ................. G06Q 50/28; G06Q 10/043; G06Q 10/06315; G06F 16/2379; G06F 16/24; G06N 20/00; G06N 5/04
USPC ........................................................ 705/7.11
See application file for complete search history.

(56) References Cited

U.S. PATENT DOCUMENTS

| | | | |
|---|---|---|---|
| 9,230,233 B1 * | 1/2016 | Sundaresan | ........ G06Q 10/0832 |
| 2019/0102874 A1 * | 4/2019 | Goja | ...................... G06N 20/00 |

OTHER PUBLICATIONS

"Machine Learning Application in Predictive Maintenance" to Liulys, Jun. 6, 2019 (Year: 2019).*

* cited by examiner

*Primary Examiner* — Charles Guiliano
*Assistant Examiner* — Po Han Lee
(74) *Attorney, Agent, or Firm* — Kilpatrick Townsend & Stockton LLP

(57) ABSTRACT

Techniques for improving packaging systems are described. In an example, a computer system receives item data from a workstation. The item data includes a description of an item. The workstation is configured to facilitate packaging of the item. Based at least in part on an input to the predictive model, the computer system generates a package decision indicating a package type associated with the packaging of the item. The input is based at least in part on the item data. The predictive model is trained based at least in part on damage data associated with packaging. The computer system sends the package decision to the workstation.

20 Claims, 12 Drawing Sheets

PREDICTIVE PACKAGING SYSTEM

CROSS-REFERENCES TO RELATED APPLICATIONS

This application claims the benefit of U.S. Provisional Application No. 62/942,011, filed Nov. 29, 2019, which is hereby incorporated by reference in its entirety for all purposes.

BACKGROUND

Inventory systems, such as those in mail order warehouses and supply chain distribution centers, often utilize complex material handling systems, such as robotic systems and conveyors, to manage, handle, and convey items and/or storage containers in and out of a workspace. On both the in-flow and out-flow of items, an item may be packaged to protect it from damage.

BRIEF DESCRIPTION OF THE DRAWINGS

Various embodiments in accordance with the present disclosure will be described with reference to the drawings, in which.

DETAILED DESCRIPTION

Figure 1:
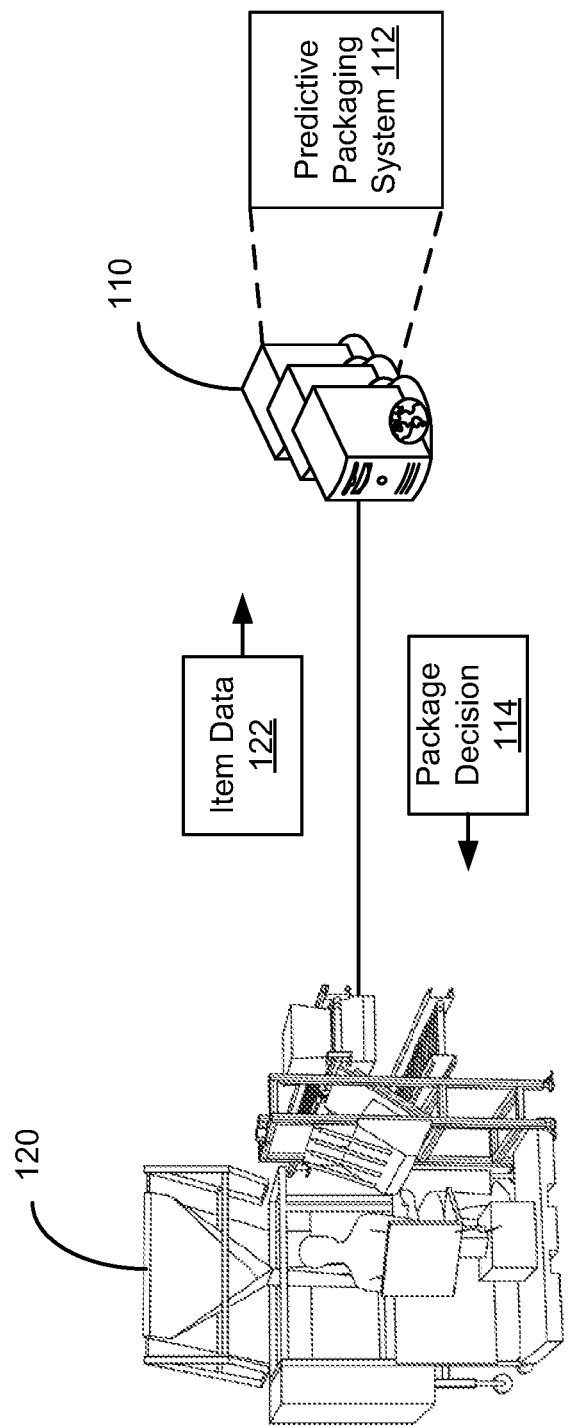
FIG. 1 illustrates an example of a computing environment for controlling the packaging of items, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving the performance of a material handling system. In an example, the material handling system may be commissioned to handle items, including the packaging and moving of items in and out of a workspace, such as a storage facility. The material handling system may need to be operable at a particular service level. Its quality of service (QoS) may in part be measured based on a damage rate of packaged items, where the damage rate may indicate the rate (e.g., percentage) of items that are damaged in part or fully after having been packaged. Generally, the higher the rate, the less efficient the packaging is. The damage rate exceeding a certain rate threshold can be translated into the QoS falling below a target service level and, thus, an overall decrease and, potentially, unacceptable performance of the material handling system.

To improve the damage rate (e.g., reduce it) and, thus, improve the performance of the material handling system, embodiments of the present disclosure involve the use of a predictive packaging system. In particular, the predictive packaging system may represent a computing resource hosting a machine learning (ML) model. The ML model is trained to output a package decision indicating a type of package to use for an item. The training may rely on known packaging data and damage data for a plurality of items, where these items may be organized in groups according to common attributes affecting the packaging (e.g., shape, weight, fragility, etc.) and differing by attributes that do not affect the packaging (e.g., color). The packaging data and damage data may be collected over time based on actual packaging and delivery of items to end users. Such damage data may be used as training labels in a supervised training process of the ML model. The training may also rely on a textual description of the items, where the textual description may be available from a database that stores the textual description to support a catalog of items that can be surfaced to the end users via web pages or other network documents. The training may also rely on computer vision, where images of the items may be input to the ML model. Once trained, the ML model can be deployed to output the package decision. In particular, input to the ML model may include a textual description and/or an image of an item, whereby the ML model may indicate the package type to use for the item.

To illustrate, consider an example of a toy that is newly available, has a new attribute (e.g., its weight changed), or has new configuration for the supplier's original container (e.g., the original packaging in which the toy is contained). Not enough data may exist for that toy to make a package decision for shipment from a storage facility to a delivery location of an end user. Instead, the textual description and/or an image of the toy can be input to the predictive packaging system. In turn, the packaging system may output data indicating that a padded mailer should be used. Such data can be used by the material handling system to package the toy in a padded mailer.

In the interest of clarity of explanation, embodiments of the present disclosure are described in connection with packaging an item at a storage facility for shipment to a destination. However, the embodiments are not limited as such and similarly apply to packaging items for any purpose, such as for moving an item between two locations regardless of the type of these locations, and/or for storing an item.

FIG. 1 illustrates an example of a computing environment for controlling the packaging of items, in accordance with at least one embodiment. As illustrated, the computing environment includes a computer system 110 and a workstation 120. Items may be packaged at the workstation 120 based on package decisions that are output of the computer system 110.

In an example, the computer system 110 may include, among other components, a predictive packaging system 112. The predictive packaging system 112 can be implemented as a set of hardware resources, such as a set of servers, and/or a set of virtual resources, such as a set of virtual server instances, hosting a set of ML models and other tools as further described in connection with the next figures. The predictive packaging system 112 can be configured to output package decisions. A package decision may identify a type of package to use from various package types, such as and only by way of example from a corrugated box, padded mailer, unpadded mailer, original container, package free, where each type may also depend on the material (e.g., paper, plastic, etc.), size (e.g., height, weight, length, volume capacity, etc.), and/or specific padding (e.g., type, amount, location of padding, etc.) used for the package.

The workstation 120 may be a component of a material handling system within a storage facility. In an example, the workstation 120 may include a set of computing devices, some of which may be in communication with the computer system 110 over a data network, and a set of tools and spaces for receiving containers of items transported via robots or conveyor belts, retrieving a particular item from the received items, packaging the item, and preparing the package item for shipping (e.g., adding a shipping training label, moving the item to a conveyor belt or a robot, etc.). Such operations of the workstation 120 can be automated via controls of the computing device(s) and/or can be partially manual (e.g., necessitating an operator to, for instance, pick and place an item in a package).

In an example, upon a trigger event associated with an item, a computing device of the workstation 120 may send item data 122 about the item to the computer system 110. The trigger event corresponds to input about the item at the workstation 120 and may include a scan of a barcode of the item by a scanner of the workstation 120, a radio frequency (RF) read of an RF identifier (RFID) tag on the item by an RFID reader of the workstation 120, an image of the item captured by an optical sensor of the workstation 120, or user input at an input device of the workstation 120. The item data 122 may include text data describing the item and/or image data from the image of the item. The text data can be determined by the computing devices based on a query to a database that stores such data. The query can include a unique identifier of the item determined from the barcode scan, RFID read, image, and/or user input.

In turn, the computer system 110 inputs the item data 122 to the predictive packaging system 112. The predictive packaging system 112 may output a package decision 114 based on the item data 122 and this package decision 114 can be sent back to the same or a different computing device of the workstation 120. The package decision 114 may identify the package type for the item. The package type can be used as a control that automates the packaging of the item and/or can be presented at a user interface of the workstation 120 such that the operator of the workstation 120 may package the item accordingly.

Figure 2:
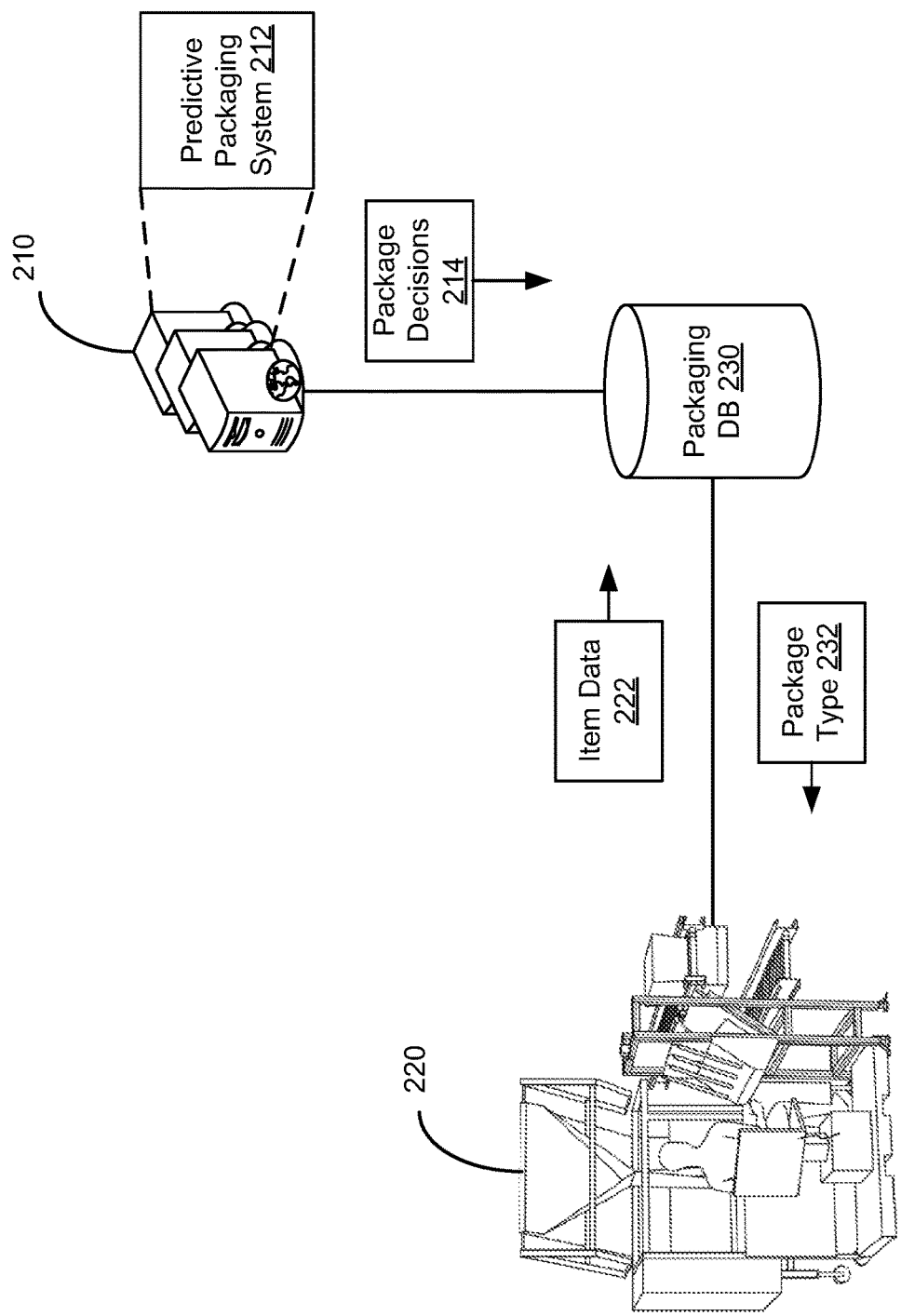
FIG. 2 illustrates another example of a computing environment for controlling the packaging of items, in accordance with at least one embodiment.

FIG. 2 illustrates another example of a computing environment for controlling the packaging of items, in accordance with at least one embodiment. The computing environment of FIG. 2 is similar to the one of FIG. 1, except that package decisions may be performed offline for items or item groups.

As illustrated in FIG. 2, the computing environment may include a computer system 210, a workstation 220, and a packaging database 230. Similar to the computer system 110 of FIG. 1, here the computer system 210 may include a predictive packaging system 212. The workstation 220 may also be similar to the workstation 120 of FIG. 1, except that one or more of its computing device(s) may query the packaging database 230.

The packaging database 230 is an example of a data store storing package decisions. For instance, the packaging database 230 may store an association between an item and a package type for the item. In an example, the association can be stored as a key-value pair, where the key is a unique identifier of the item and the value is the package type. In another illustration, the packaging database 230 may store an association between a group of items and a package type for the group. In an example, the group may represent a category of items that share common attributes, while also having other attributes that are different and that may not affect the package decision. For instance, a television group is a category of electronics that includes televisions available from different manufacturers and having different sizes. The association can be stored as a key-value pair, where the key is a unique identifier of the group and the value is the package type.

In an example, the predictive packaging system 212 may be used in an offline mode to populate the packaging database 230. In particular, item data for a plurality of items may be input to the predictive packaging system 212 that, in turn, outputs package decisions 214. If the items were not logically organized in groups, the package decisions 214 identify the package type per item. If the items were logically organized in groups, the package decisions 214 identify the package type per item. Such package decision 214 are input to the packaging database 230 that may store them as key-value pairs.

The workstation 220 may rely on the database 230 in an online mode. In particular, upon a trigger event associated with an item, similar to the one described in connection with FIG. 1, item data 222 may be used in a query to the packaging database 230. A query result may be returned and can identify the package type 232 to use for the item.

In an example, the packaging database 230 may be stored remotely from the workstation 220. In this example, a computing device of the workstation 220 may submit a query thereto over a data network. In another example, the computing device may store the database 230 (e.g., in local memory or cache).

Figure 3:
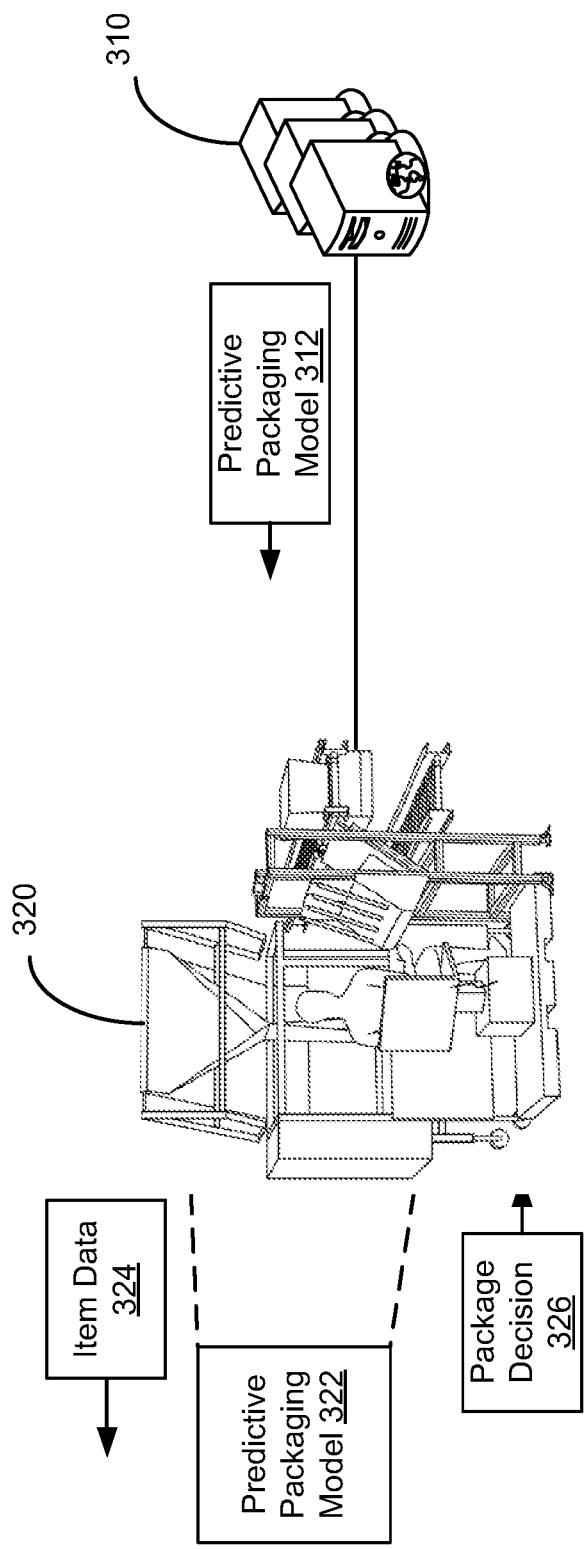
FIG. 3 illustrates yet another example of a computing environment for controlling the packaging of items, in accordance with at least one embodiment.

FIG. 3 illustrates yet another example of a computing environment for controlling the packaging of items, in accordance with at least one embodiment. The computing environment of FIG. 3 is similar to the one of FIG. 1, except that package decisions may be performed locally at a workstation.

As illustrated in FIG. 3, the computing environment may include a computer system 310 and a workstation 320. Similarly to the computer system 110 of FIG. 1, here the computer system 310 may also include a predictive packaging system. The workstation 320 may also be similar to the workstation 120 of FIG. 1, except that one or more of its computing device(s) may host a predictive packaging model 322. The predictive packaging model 322 may be a virtual instance of the predictive packaging system. In this way, the predictive packaging system may be trained offline based on data available to the computer system 310. Upon training completion, the computer system 310 may send an instance of the trained predictive packaging system (illustrated in FIG. 3 as a predictive packaging model 312) to the computing device(s) of the workstation 320 for storage thereat as the predictive packaging model 322. Accordingly, the workstation 320 hosts the predictive packaging model 322 on a computing component of the workstation 320. Upon updates to the predictive packaging system, the computer system 310 may also send such updates (e.g., in a pull) to the workstation 320 as, for instance, software updates.

In an example, the predictive packaging model 322 may be used in an offline mode. In particular, upon a trigger event associated with an item, similar to the one described in connection with FIG. 1, item data 324 may be input to the predictive packaging model 322. In response, the predictive packaging model 322 may output a package decision 326 indicating a package type to use for the item.

In the examples of FIGS. 1-3, each of the predictive packaging systems may be trained offline based on different types of data. An example of the training is further described in FIG. 4. The data may be available from different sources accessible to each of the computer systems. For instance, the training data may include item data that includes textual description and/or images of items and available from a first database. Such items may correspond to items that were actually packaged and shipped to end users and may be identified based on user orders stored in a second database. The training data may also include damage data (e.g., type of damage (such as full or partial, or no damage)) associated with the user orders, where the damage data may be stored in a third database. The damage data may be collected based on user follow-up inputs to the user orders and shipments through different communications channels including, for instance, online reviews, electronic mail messages, phone calls, social media messages, and the like.

Once trained and deployed, measurements about the package decisions may be tracked. The measurements may include, per package decision, the actual package decision, the used package (if different), and damage data. These measurements can be collected over time for a batch or a continuous update or re-training of the predictive packaging system.

Figure 4:
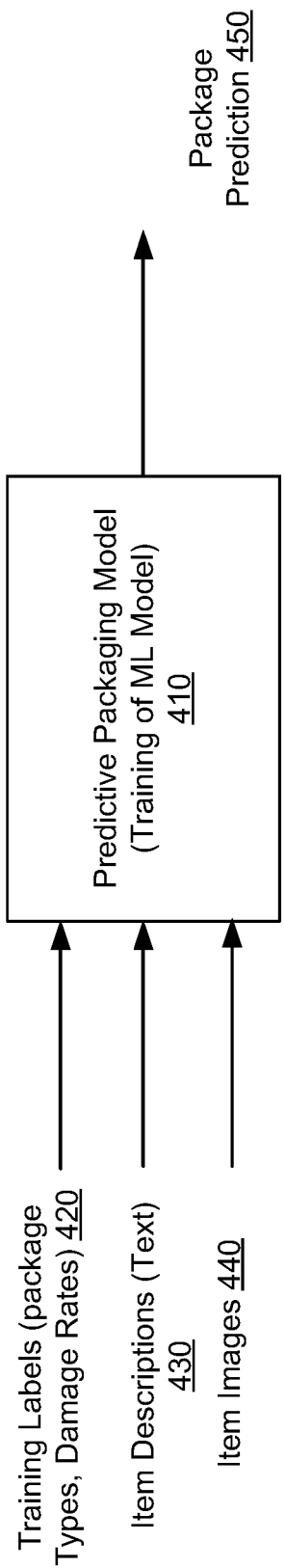
FIG. 4 illustrates an example of training a predictive packaging model, in accordance with at least one embodiment.

FIG. 4 illustrates an example of training a predictive packaging model 410, in accordance with at least one embodiment. The predictive packaging model 410 may be implemented as an ML model, such as a deep neural network, convolutional neural network, recursive neural network, a reinforcement learning model, a regression model, a Bayesian model, or another type of ML model.

In an example, the training may be supervised. In this example, the training data set may include training labels 420. If unsupervised, no training labels 420 may be needed. In both cases, the training data set item may also include descriptions 430 having one or more textual formats (e.g., txt, XML, etc.) and/or item images 440 having one or more image formats (e.g., JPEG, BMP, etc.).

In an example, a training label 420 may indicate a package type and damage to a packaged item. If the package type differs from a recommended package type, the training label 420 may include information about the difference and/or the reason for the difference. For instance, the recommended package type may have been overridden by an operator (e.g., a packer). The training label 420 may include information about the override. The damage may be none (e.g., no damage at all), partial, or full, or may be qualified differently (e.g., on a scale of zero to ten). The packaged item may be associated with a user order for an item. The package type may be stored as package data. And the damage may be stored as damage data. The package data may be collected from a storage facility, a workstation where the item may have been packaged and associated with the user order, and/or from any computing node along the fulfillment lane between the storage facility and the delivery location (such as from a device of a delivery operator, where the device scans the package and sends the package data). The damage data may be collected over one or more communications channels in association with the user order. The communications channels may include online channels and phone-based channels. For instance, customer return data, images of products in packaging, social media posts about packaged items, online customer reviews, concessions provided to customers for damages to packaged items may be collected from the communications channels and stored in a data store. In addition, damage rates from historical data and drop test data from tests performed on packaged items and indicating damages may be stored in the data store. Further, the package data may be collected from a computing node along the fulfillment lane between the storage facility and the delivery location (such as from a device of a delivery operator, where the device sends the damage data along with an identifier of the package and/or user order). Each of the stored data may be labeled and added to the training data set.

An item description 430 of an item may include a text describing the item, including attributes of the item. The attributes can include the name of the item, description of the item, group of the item, supplier, of the item weight of the item, type of supplier's original container of the item, price of the item, and/or any other information about the item available from a catalog about items (where the catalog may be stored in a database), from a network document (e.g., a web page) of the supplier, or from third party network documents about the item. Natural language processing may be applied to the item description 430 to generate a bag of words that is then input to the predictive packaging model 410.

An item image 440 of an item may include an image of the item. The image may be captured by an optical system upon receipt of the item in a storage facility and/or at a workstation prior to packaging the item.

The training labels 420, item descriptions 430, and item images 440 may be stored in one or more databases and may be associated with each other. For instance, when stored, a training label of an item may be associated with an item identifier (or a group of identifiers) based on a user order for the item. The item identifier (or the group identifier) may be used to further associate the training label with the item description and the item image of the item.

The training labels 420 may be used as a control (e.g., ground truth) and the item descriptions 430 and item images 440 may be used as variables in the training of the predictive packaging model 410. The training may depend on the type of the used ML model. For instance, for a convolutional neural network, the training may minimize a loss function defined as a function of a package prediction 450 (e.g., a predicted package decision) and the actual damage data for when the predicted package type was actually used. The goal of the loss function is to minimize the damage. A back-propagation algorithm may be implemented to iteratively tune the weights of the connections between the nodes of the convolutional network.

In an illustrative example, one or more data sources store descriptions and/or images about an item, such as data retrieved from a catalog of items and/or from online data sources. From the item descriptions, numerical features can based on a mean imputation and normalization. Also from the item descriptions, raw features and descriptive features can be derived based on a set of language processing rules including, natural language and semantic processing rules (e.g., removing brand names, removing single characters, removing special characters, removing HTML tags, removing stop words, lower cases, stemming words, replace words with equivalents, translate and/or filters words to a particular language, etc.) to form a bag of words that is then further processed to generate term frequency-inverse document frequency metrics. The numerical, raw, and descriptive features, as further processed, can form feature vectors that are input predictive packaging model 410.

Figure 5:
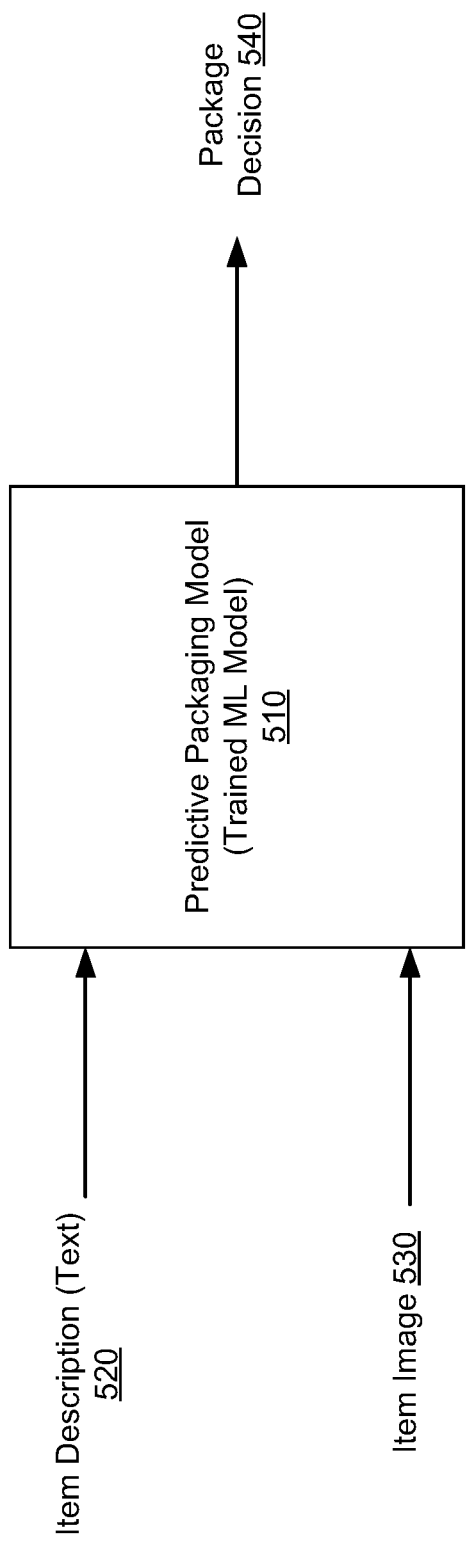
FIG. 5 illustrates an example of using a trained predictive packaging model, in accordance with at least one embodiment.

FIG. 5 illustrates an example of using a trained predictive packaging model, in accordance with at least one embodiment. Upon completion of the training as described in connection with FIG. 4, a predictive packaging model 510 (e.g., the trained predictive packaging model 410 of FIG. 4) may be used to generate package decisions.

In an example, an item description 520 of an item (e.g., in a text format) and/or an item image 530 of the item (e.g., in an image format) may be input to the predictive packaging model 510. Alternatively or additionally, natural language processing may be applied to the item description 520 to generate a bag of words that is then input to the predictive packaging model 510. This input can be provided based on a trigger event, as described in connection with FIGS. 1-3. In response, the predictive packaging model 510 may output a package decision 540 indicating the package type to use for the item and the probability for damage (e.g., padded mailer with a damage probability of five percent).

Figure 6:
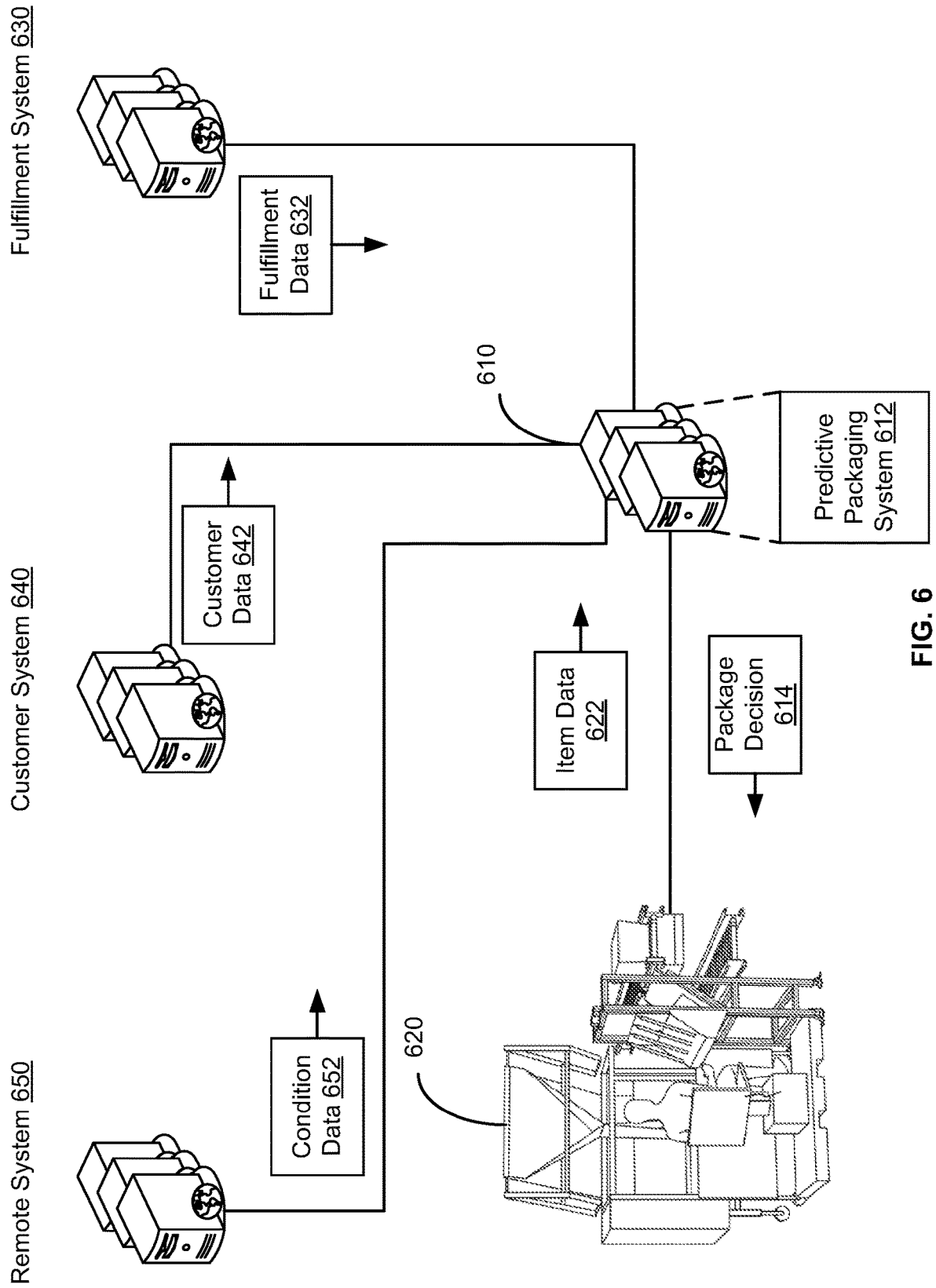
FIG. 6 illustrates a further example of a computing environment for controlling the packaging of items, in accordance with at least one embodiment.

FIG. 6 illustrates a further example of a computing environment for controlling the packaging of items, in accordance with at least one embodiment. As illustrated, the computing environment includes a computer system 610, a workstation 620. A fulfillment system 630, and customer system 640, and a remote system 650. Items may be packaged at the workstation 620 based on package decisions that are output of the computer system 610. In particular, the computer system 610 includes a predictive packaging system 612. Upon input data to the predictive package system 612, a package decision 614 is generated and output to the workstation 620. The input data can be received from any or a combination of the workstation 620, the fulfillment system 630, the customer system 640, or the remote system 650 and can include any or a combination of item data 622, fulfillment data 632, customer data 642, or condition data 652.

In an example, the computer system 610 and the workstation 620 may be the same as any of the computer systems 110, 210, and 310 and any of the workstations 120, 220, and 320, respectively, of FIGS. 1-3. The fulfillment system 630 can be implemented as a set of hardware resources, such as a set of servers, and/or a set of virtual resources, such as a set of virtual server instances, hosting a set of computing services outputting the fulfillment data 632 per an order for a set of items requested by a customer (e.g., an end user) and to be packaged in a set of packages. The fulfillment data 632 associated with an order for an item indicates how the order is to be fulfilled by identifying, for instance, a source of the item, an delivery destination, a type of delivery method (e.g., ground, air, etc. and next hour, next day, two days, etc.), a vehicle type (e.g., truck, truck size, etc.), a route (e.g., number of stops, coordinates of the route, etc.), and/or other data related to delivering the item from the source to the delivery destination.

The customer system 640 can be implemented as a set of hardware resources, such as a set of servers, and/or a set of virtual resources, such as a set of virtual server instances, hosting a set of computing services outputting the customer data 642 per customer (e.g., end user) that has requested an order for a set of items. The customer data 642 associated with a customer includes, for instance, data from a profile of the customer, a customer preference for a type of package, a customer preference for a material of package (e.g., sustainable material), a history of orders and corresponding package types used to fulfill the orders, a history of damages, a history of returns of damaged packages or items, a history of concessions offered for damages, and/or other data related to packaging items to the customer.

The remote system 650 can be implemented as a set of hardware resources, such as a set of servers, and/or a set of virtual resources, such as a set of virtual server instances, hosting a set of computing services outputting the condition data 652 per customer (e.g., end user) and/or order. The condition data 652 can indicate, for a customer and/or data, other types of data than customer data 642 and fulfillment data 632 and can include, for instance, data about a condition satisfied when the order was placed, packaged, and/or fulfilled. For instance, the condition data 52 incudes environmental data about historical weather conditions (e.g., temperature, humidity, precipitation, etc.) associated with historical orders and/or similar environmental data expected when an order is to be fulfilled (e.g., weather conditions along a route, at the source, and/or at the delivery destination).

In an example, upon a trigger event associated with an item, a computing device of the workstation 620 may send item data 622 about the item to the computer system 610. The trigger event may include a scan of a barcode of the item by a scanner of the workstation 620, a radio frequency (RF) read of an RF identifier (RFID) tag on the item by an RFID reader of the workstation 620, an image of the item captured by an optical sensor of the workstation 620, or user input at an input device of the workstation 620. The item data 622 may include text data describing the item and/or image data of the image the item. The text data can be determined by the computing devices based on a query to a database that stores such data. The query can include a unique identifier of the item determined from the barcode scan, RFID read, image, and/or user input. Alternatively or additionally, the trigger event may be a customer's order, whereby the fulfillment data 632 can be received from the fulfillment system 630 along with the item data 622.

In turn, the computer system 610 inputs the item data 622, the fulfillment data 632, the customer data 642, and the condition data 652 to the predictive packaging system 612. The predictive packaging system 612 may output a package decision 614 based on the item data 622, the fulfillment data 632, the customer data 642, and the condition data 652 and this package decision 614 can be sent back to the same or a different computing device of the workstation 620. The package decision 614 may identify the package type for the item. The package type can be used as a control that automates the packaging of the item and/or can be presented at a user interface of the workstation 620 such that the operator of the workstation 620 may package the item accordingly.

Figure 7:
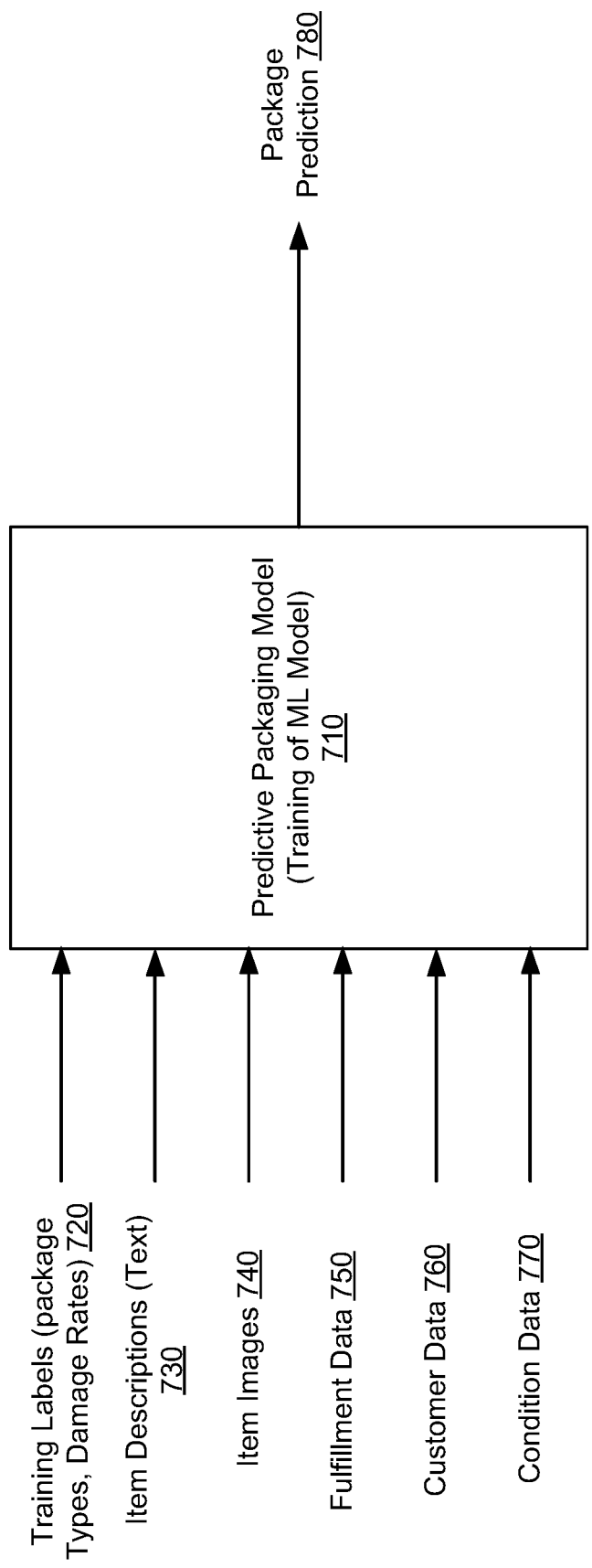
FIG. 7 illustrates another example of training a predictive packaging model, in accordance with at least one embodiment.

FIG. 7 illustrates another example of training a predictive packaging model, in accordance with at least one embodiment. The predictive packaging model 710 may be implemented as an ML model, such as a deep neural network, convolutional neural network, recursive neural network, a reinforcement learning model, a regression model, a Bayesian model, or another type of ML model.

In an example, the training may be supervised. In this example, the training data set may include training labels 720. If unsupervised, no training labels 720 may be needed. In both cases, the training data set item may also include descriptions 730 having one or more textual formats (e.g., txt, XML, etc.), item images 740 having one or more image formats (e.g., JPEG, BMP, etc.), fulfillment data 750, customer data 760, and condition data 770.

In an example, a training label 720 may indicate a package type and damage to a packaged item. The damage may be none (e.g., no damage at all), partial, or full, or may be qualified differently (e.g., on a scale of zero to ten). The packaged item may be associated with a an order for an item by a customer. The package type may be stored as package data. And the damage may be stored as damage data. The package data may be collected from a storage facility and/or a workstation where the item may have been packaged and associated with the user order. The damage data may be collected over one or more communications channels in association with the user order. The communications channels may include online channels and phone-based channels. For instance, customer return data, images of products in packaging, social media posts about packaged items, online customer reviews, concessions provided to customers for damages to packaged items may be collected from the communications channels and stored in a data store. In addition, damage rates from historical data and drop test data from tests performed on packaged items and indicating damages may be stored in the data store. Each of the stored data may be labeled and added to the training data set.

An item description 730 of an item may include a text describing the item, including attributes of the item. The attributes can include the name of the item, description of the item, group of the item, supplier of the item, weight of the item, type of supplier's original container of the item, price of the item, and/or any other information about the item available from a catalog about items (where the catalog may be stored in a database), from a network document (e.g., a web page) of the supplier, or from third party network documents about the item. Natural language processing may be applied to the item description 730 to generate a bag of words that is then input to the predictive packaging model 710.

An item image 740 of an item may include an image of the item. The image may be captured by an optical system upon receipt of the item in a storage facility and/or at a workstation prior to packaging the item.

Fulfillment data 750 of an item may indicate parameters associated with fulfilling orders for the item from one or more source(s) to one or more delivery destinations, as described in connection with FIG. 6. In this case, the fulfillment data 750 can include historical fulfillment data about previously fulfilled orders. Similarly, the customer data 760 of an item may indicate parameters associated with customers who requested orders for the item, as described in connection with FIG. 6. In this case, the customer data 760 can include historical customer data about customers that previously requested orders. And the condition data 770 of an item may indicate parameters associated with orders for the item and/or customers who requested the orders, as described in connection with FIG. 6. In this case, the condition data 770 can include historical condition data about customers that previously requested orders and/or previous fulfillments of such orders. For a particular item and a particular order for this item, the training data can include a corresponding training label (e.g., the package type and the damage, if any), the item description, one or more images of the item, fulfillment data associated with fulfilling the item, customer data associated with a customer that requested the particular order, and condition data associated with this customer and/or the particular order.

The training labels 720, item descriptions 730, item images 740, fulfillment data 750, customer data 760, and condition data 770 may be stored in one or more databases and may be associated with each other. For instance, when stored, a training label of an item may be associated with an item identifier (or a group of identifiers) based on a user order for the item. The item identifier (or the group identifier) may be used to further associate the training label with the corresponding item description, item image, fulfillment data, customer data, and condition data.

The training labels 720 may be used as a control (e.g., ground truth) and the item descriptions 730, item images 740, fulfillment data 750, customer data 760, and condition data 770 may be used as variables in the training of the predictive packaging model 710. The training may depend on the type of ML model used. For instance, for a convolutional neural network, the training may minimize a loss function defined as a function of a package prediction 780 (e.g., a predicted package decision) and the actual damage data for when the predicted package type was actually used. The goal of the loss function is to minimize the damage. A backpropagation algorithm may be implemented to iteratively tune the weights of the connections between the nodes of the convolutional network.

In an illustrative example, a Bayesian model is used, where this model implements a beta-binomial for which tunable constants determined through the training. Each package type can be associated with groups (e.g., training data for each package type may be set in A and B groups for comparison). In another illustrative example, a reinforcement model is used, where this model implements a multi-armed bandit algorithm. In this example, decisions for packages types are explored according to the multi-armed bandit algorithm to gain information, thereby allowing improved decisions. In both examples, part of generating training data includes, making decisions for package types for the purpose of gathering additional training data in a product area or region where training data is lacking (including any of item descriptions, item images, fulfillment data, customer data, and/or condition data).

Figure 8:
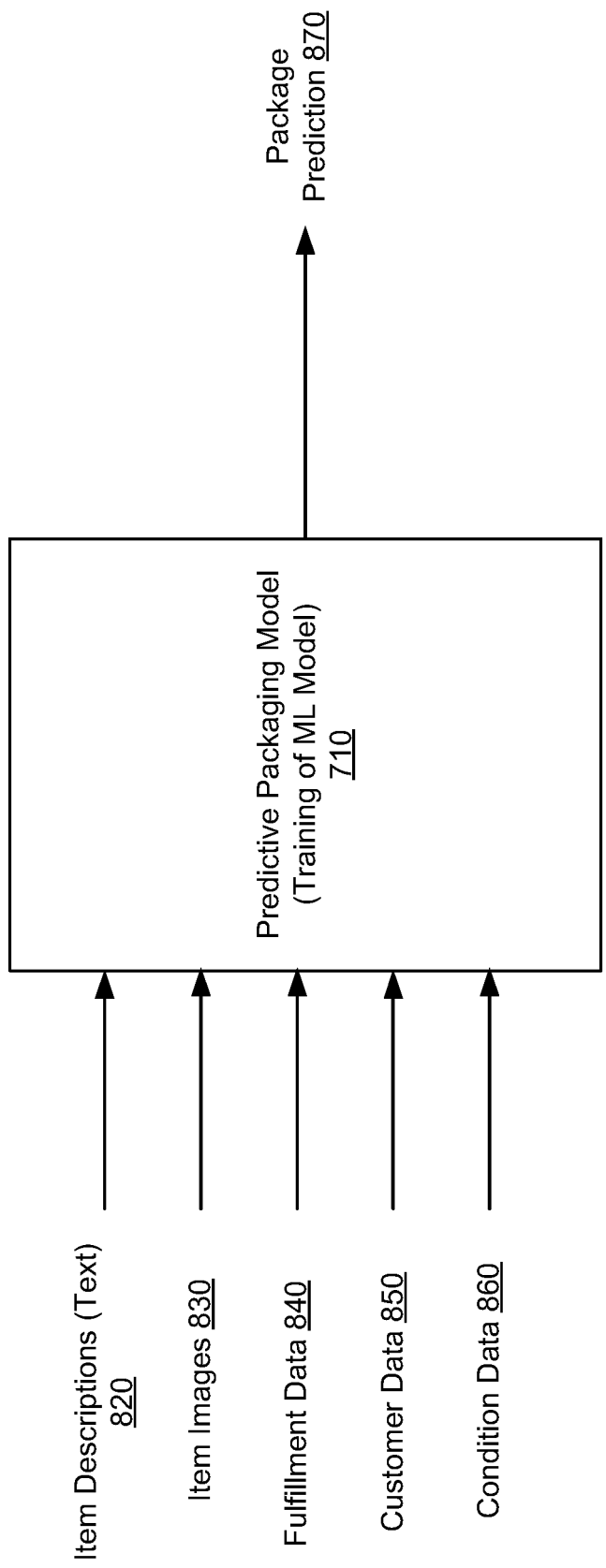
FIG. 8 illustrates another example of using a trained predictive packaging model, in accordance with at least one embodiment.

FIG. 8 illustrates another example of using a trained predictive packaging model, in accordance with at least one embodiment. Upon completion of the training as described in connection with FIG. 7, a predictive packaging model 810 (e.g., the trained predictive packaging model 710 of FIG. 7) may be used to generate package decisions.

In an example, an item description 820 of an item (e.g., in a text format), an item image 830 of the item (e.g., in an image format), fulfillment data 840 about an order for the item by a customer, customer data 850 of the customer, and/or condition data 860 associated with the customer and/or the order may be input to the predictive packaging model 810. This input can be provided based on a trigger event, as described in connection with FIGS. 1-3 and 6. In response, the predictive packaging model 810 may output a package decision 870 indicating the package type to use for the item and the probability for damage (e.g., padded mailer with a damage probability of five percent).

Referring back to FIGS. 4-5 and 7-8, the training and use of a predictive model can be done in batches and/or in real-time. For instance, a job may be scheduled periodically to retrain the predictive model in a batch mode based on additionally collected training data. In comparison, the use of the trained predictive model may be performed in real-time based on an item to package following an order of a customer for the item.

Figure 9:
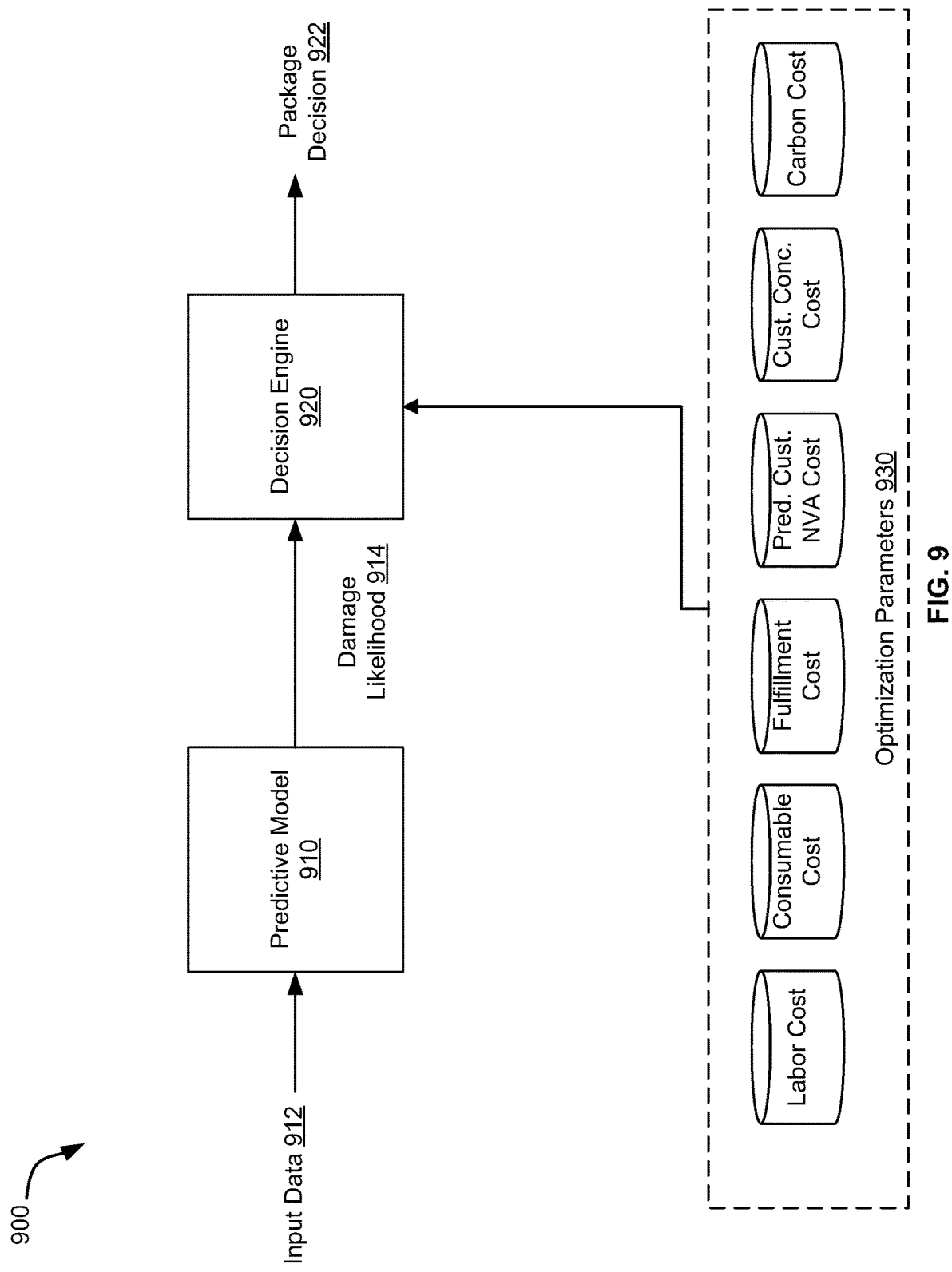
FIG. 9 illustrates an example of a predictive system for controlling the packaging of items, in accordance with at least one embodiment.

FIG. 9 illustrates an example of a predictive system 900 for controlling the packaging of items, in accordance with at least one embodiment. As described herein above, the predictive system 900 can host a predictive model 910, such as a trained ML model, to output a package decision. The predictive model 910 itself can output the package decision (e.g., the type of package to use). Additionally or alternatively, the predictive model 910 can output a prediction of a likelihood of damage per package type and the package decision can be generated based on this likelihood. As described in connection with FIG. 9, the predicted likelihood can be compared to thresholds and input to a decision engine 920 that generates the package decision by optimizing a number of parameters 930.

In an example, input data 912 is provided to the predictive model 910 from one or more systems. For instance, the input data 912 can include any or a combination of item data (text description and/or image data) about an item, fulfillment data for fulfilling an order for the item requested by a customer, customer data of the customer, and/or condition data about the fulfillment and/or the customer. The predictive model 910 can receive the input data 912 via one or more application programming interface (API) calls or web calls. The predictive model 910 is trained to output a likelihood of damage per type of available package based on the input data. For instance, the predictive model 910 outputs that, for a particular item corresponding to the input data 912, a corrugated box has a likelihood of two percent damage, whereas a padded mailer has a likelihood of five percent damage.

The various likelihoods can be compared to one or more thresholds. The comparison can be performed by the decision engine 920 or by another computing component of the predictive system 900. A threshold can be set based on one or more of the item data, fulfillment data, customer data, and/or condition data. For instance, if the offer's value exceeds a certain amount, the threshold can be decreased. If the customer data indicates a history of damages with items delivered to the customer, the threshold can similarly be decreased. If the fulfillment data indicates a type of vehicle or a route with history of increased damages, the threshold can similarly be decreased. If the condition data indicates a wet or cold weather, the threshold can also be decreased. The comparison to a threshold can be used to filter out a package type. In particular, if the likelihood of damage corresponding to the package type exceeds the threshold, that package type can be filtered out. For instance, if a threshold is set to three percent and the corrugated box has a likelihood of damage of two percent damage, whereas a padded mailer has a likelihood of damage of five percent damage, the option to use the padded mailer can be filtered out and the option to use the corrugated box can be further processed as a candidate package type option based on the optimization parameters 930.

The optimization parameters 930 include any or a combination of labor cost, consumable cost, fulfillment cost, predicted customer negative value action (NVA) cost, customer concession cost, or carbon cost. Each of such costs can be generated by one or more computer systems including ones that can host cost predictive models and can be stored in one or more databases. For instance, the predicted NVA cost can be computed for the customer by looking up a packaged item that was delivered, but reported as damaged and the impact to the orders from the customer within a predefined time window after the delivery in comparison to historical orders of the customer within a predefined time window prior to the delivery. A negative impact indicating a relative decrease in the number of customer orders after the delivery can be translated in the predicted NVA cost. In another illustration, customer concession cost can be computed by looking up the history of orders requested by the customer over a predefined time window, the number of reported damages, and the number of concessions (e.g., refunds, replacements, discounts, etc.) offered and accepted in response to the reported damages. The customer concession data can be a function of the number of concessions and the number of placed orders within the predefined time period. Each of such computations can be performed by a predictive model that includes, for instance, a machine learning model.

Each of the optimization parameters 930 can be associated with a weight, and a total cost can be computed as a weighted sum of the one or more of the optimization parameters. The decision engine 920 receives likelihoods of damage 914 from the predictive model 910. For each of the candidate package type options, the decision engine 920 can be multiplied by the total cost of the corresponding likelihood of damage to generate a likely cost for the candidate package type option. The decision engine 920 may select the candidate package type option from multiple candidate package type options depending on the likely costs. For instance, the decision engine 920 selects the candidate package type option having the smallest cost and sets this candidate package type option as a package decision 922. In other words, the package decision 922 can identify a particular package type to use for an item depending on the item data, fulfillment data, customer data, and/or condition data, where this particular package type has a likelihood of damages smaller than one or more thresholds and have the smallest likely cost according to the optimization parameters 930.

FIGS. 10-18 show illustrative flows related to using a predictive model to generate a package decision, in accordance with various embodiments. Some or all of instructions for performing the operations of the illustrative flows can be implemented as hardware circuitry and/or stored as computer-readable instructions on a non-transitory computer-readable medium of a computer system, such as any of the computer systems 110, 210, 310, 610, and 900 of FIGS. 1, 2, 3, 6, and 9. The predictive model can be trained to output the package decision and can include a trained ML mode and, optionally, a decision engine. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

Figure 10:
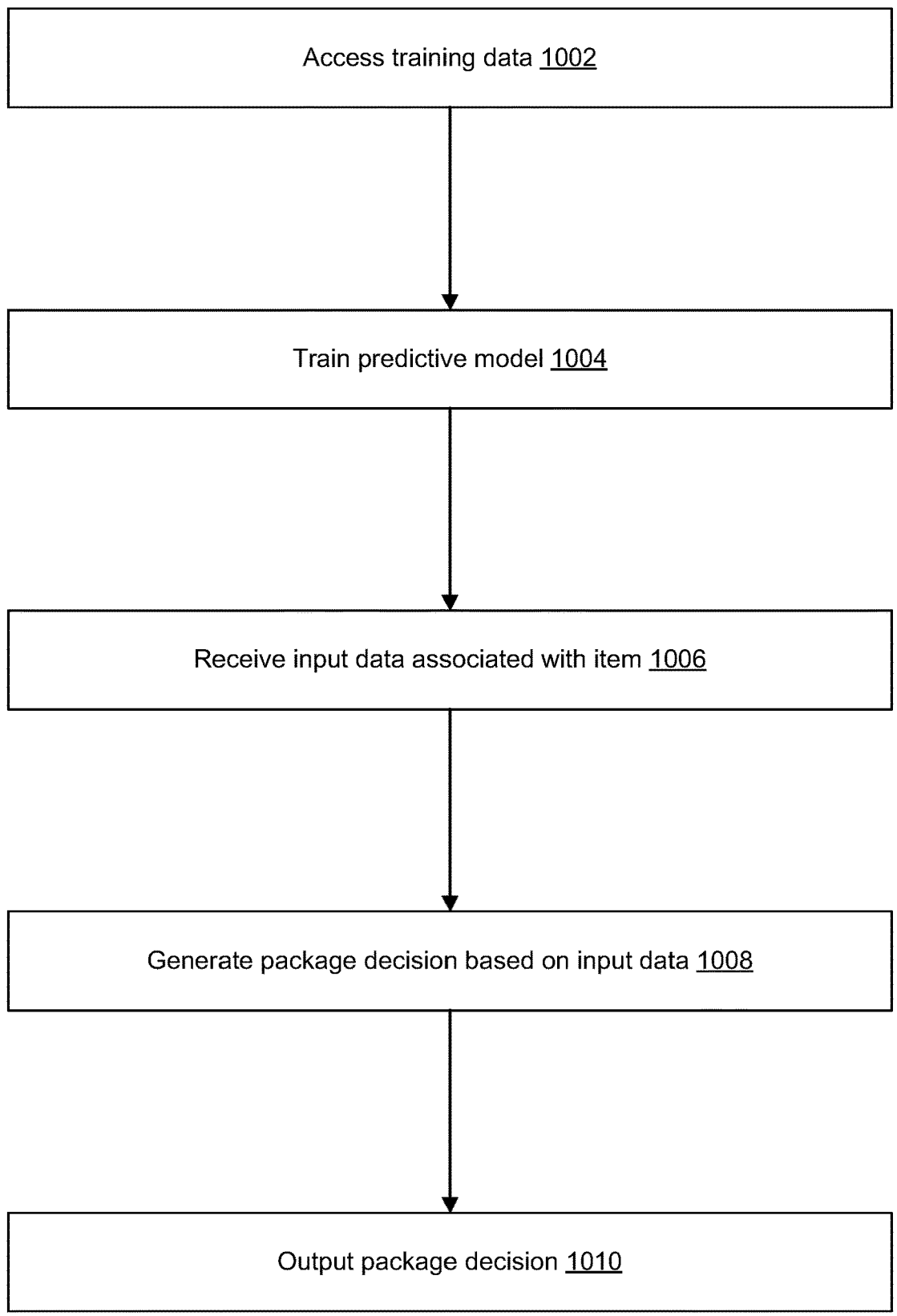
FIG. 10 illustrates an example of a flow for controlling the packaging of items.

FIG. 10 illustrates an example of a flow for controlling the packaging of items. As illustrated, the flow may start at operation 1002, where the computer system accesses training data. The training data includes any or a combination of training labels (e.g., package types, damage rates), item descriptions, item images, fulfillment data, customer data, condition data associated with historical orders for items by customers, historical fulfillments of the orders, simulated orders, and/or simulated fulfillments of the simulated orders.

At operation 1004, the computer system trains the predictive model based on the training data. For instance, the training of the ML model of the predictive model is supervised and involves using the training labels as ground truth and the other data of the training data as variables. To illustrate, the ML model is implemented as a convolutional neural network having a loss function. The training involves minimizing the loss function given the ground truth and variables to update parameters of the convolutional neural network by using a backpropagation algorithm.

At operation 1006, the computer system receives input data associated with an item. In an example, the input data is received from a workstation. The item is associated with an order of a customer for the item. The input data can include any of item data (e.g., text description and/or image data), fulfillment data associated with fulfilling the order, customer data associated with the customer, and/or condition data associated with the customer and/or the order.

At operation 1008, the computer system generates a package decision based on the input data. For instance, the computer system generates second input data from the received input data, where the input data includes, for instance, a feature vector. The second input data (e.g., the feature vector) is input to the predictive model. An output of the predictive model includes a package decision indicating the package type. In an example, the ML model outputs the package decision. In another example, the ML outputs a likelihood of damage per available package type and a decision engine generates the package decision based on one or more likelihoods of damage, as further illustrated in connection with FIG. 11.

At operation 1010, the computer system outputs the package decision to the workstation. For instance, a response is sent back to the workstation and the response includes data that identifies the package type that is to be used in the packaging of the item. The workstation, when automated, can package the item in a package corresponding to the package type. Otherwise, the workstation can display the data at a user interface for an operator to package the item in such a package.

Figure 11:
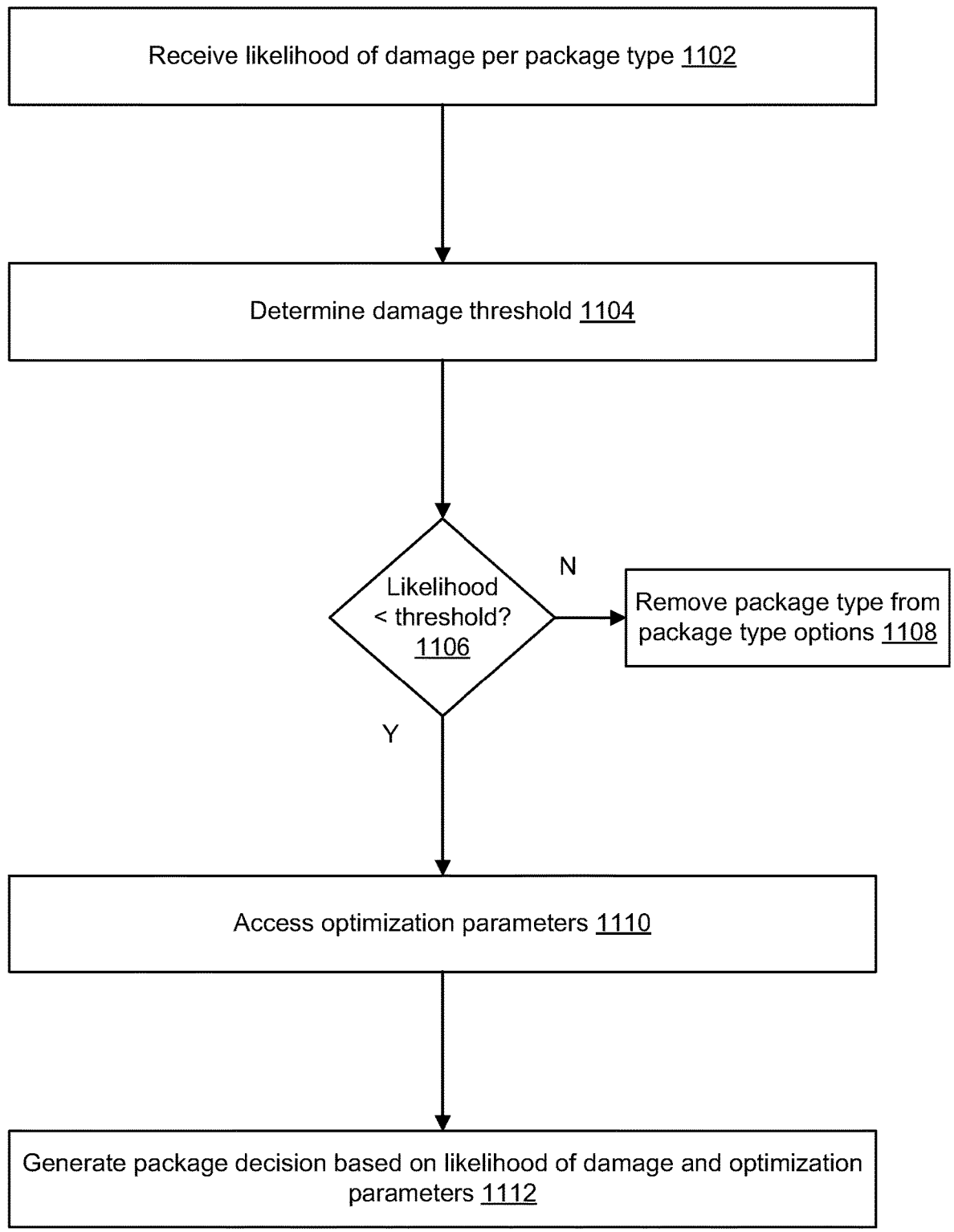
FIG. 11 illustrates an example of a flow for controlling the packaging of items based on likelihoods of damages.

FIG. 11 illustrates an example of a flow for controlling the packaging of items based on likelihoods of damages. Here, the predictive model can include an ML model trained to output a likelihood of damage per available package type and a decision engine configured to select one of the available package types as the package type to include in the package decision.

In an example, the flow may start at operation 1102, where the computer system receives likelihood of damage per available package type. For instance, the computer system provides input data associated with the order for the item to the ML model as an input. In response, the ML model outputs multiple likelihood of damages, each of which corresponds to one package type that is available to package the item.

At operation 1104, the computer system determines a damage threshold. In an example, the damage threshold can be defined based on at least one of the item data, the fulfillment data, the customer data, and/or the condition data.

At operation 1106, the computer system compares each likelihood of damage to the damage threshold. If a likelihood for damage is smaller than the damage threshold, the corresponding package type can be set as a package type option and operation 1110 can follow operation 1106. Otherwise, the corresponding package type is not a possible option to use because the likelihood of damage is unacceptable and, in this case, operation 1108 can follow operation 1106.

At operation 1108, the computer system removes each package type associated with a likelihood of damage larger than the damage threshold from the package type options. For instance, each of the available package types is associated initially with a package type option (e.g., the computer system initializes a set that includes identifiers of the available package types, where an identifier included in the set corresponds to an available package type and indicates that this available package type is a package type option), thereby reflecting the notion that this available package type can be used to package the item. However, upon determining that the associated likelihood of damage is unacceptable, the available package type can no longer be used (and, hence, the identifier of the available package type is removed from the set).

At operation 1110, the computer system accesses optimization parameters. In an example, the optimization parameters include at least one of a combination of labor cost, a consumable cost, a fulfillment cost, a predicted customer NVA cost, a customer concession cost, or a carbon cost, each of which is associated with the fulfillment of the order and/or the customer and is accessed from one or more databases. The computer system computes a total cost as a weighted sum of the optimization parameters. The computer system also computes a likely cost per package type option by, for instance, multiplying the associated likelihood of damage by the total cost.

At operation 1112, the computer system generates a package decision based on likelihoods of damage associated with the package type options and the optimization parameters. For instance, the computer system compares the likely costs of the different package type options and selects the package type option having the smallest cost. That package type option is included in the package decision as the package type to use for the item.

Figure 12:
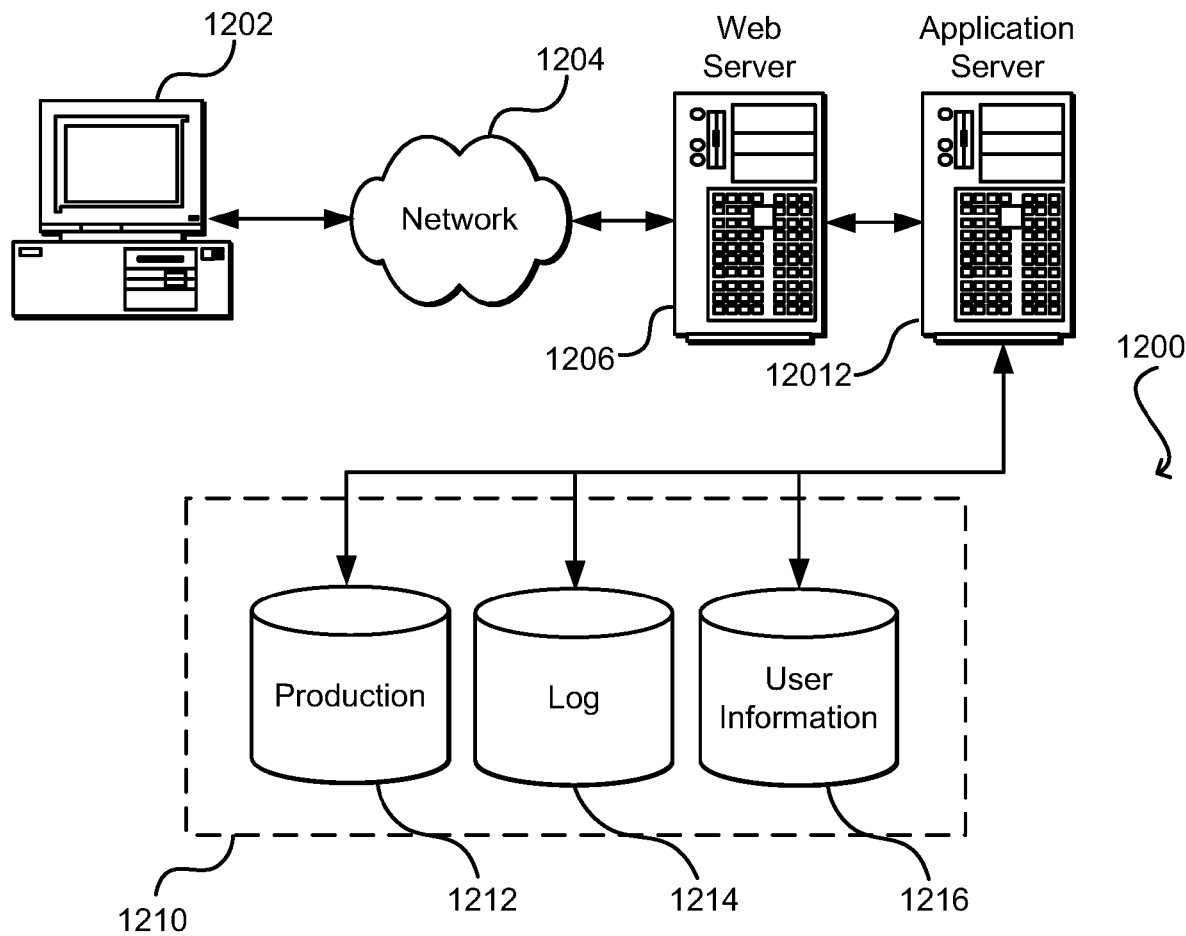
FIG. 12 illustrates aspects of an example environment 1100 for implementing aspects in accordance with various embodiments.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

What is claimed is:

1. A system comprising:
   a workstation located in a storage facility and configured to facilitate packaging of an item available from the storage facility in one of a plurality of available packages, each of the plurality of available packages corresponding to a different package type;
   a computer system comprising one or more processors and one or more memories, the one or more memories storing code of a machine learning model and computer-readable instructions that, upon execution by the one or more processors, configure the computer system to:
      receive, from the workstation, item data comprising a description of the item, the item data received based at least in part on a first input at the workstation about the item;
      generate, based at least in part on a second input to the machine learning model, a package decision indicating a package type for the item, the second input being based at least in part on the item data, the machine learning model trained to generate outputs about package decisions based at least in part on damage data associated with packaging items; and
      output, to the workstation, the package decision, the item being packaged at the workstation in a package corresponding to the package type indicated by the package decision,
   wherein the machine learning model includes at least one of a deep neural network, a convolutional neural network, a recursive neural network, or a reinforcement learning model and is iteratively trained by using batches of training data and a loss function, wherein the training comprises:
   receiving a batch of training data associated with packaged items, the batch comprising item descriptions and item images of the packaged items;
   determining actual package types and observed damages associated with the packaged items;
   generating information based at least in part on the item description, the item images, the package types, and the observed damages; and
      iteratively inputting the information to the machine learning model to generate predicted package decisions, update the loss function, and update parameters of the machine learning model based on the loss functions wherein the loss function is updated based at least in part on an output of the machine learning model indicating a predicted package type and a predicted damage for using the predicted package type, a first comparison of the predicted package type to an actual package type, and a second comparison of the predicted damage to an observed damage due to using the actual package type.

2. The system of claim 1, wherein the one or more memories store further computer-readable instructions that, upon execution by the one or more processors, configure the computer system to access fulfillment data indicating how an order for the item is to be fulfilled, wherein the second input is further based at least in part on the fulfillment data, and wherein the machine learning model is further trained based at least in part on historical fulfillment data.

3. The system of claim 1, wherein the one or more memories store further computer-readable instructions that, upon execution by the one or more processors, configure the computer system to access customer data comprising data about a customer that requested an offer for the item, wherein the second input is further based at least in part on the customer data, and wherein the machine learning model is further trained based at least in part on historical customer data.

4. The system of claim 1, wherein the one or more memories store further computer-readable instructions that, upon execution by the one or more processors, configure the computer system to access condition data indicating about at least a customer that requested an offer for the item or a fulfillment of the offer, wherein the second input is further based at least in part on the condition data, and wherein the machine learning model is further trained based at least in part on historical condition data.

5. The system of claim 1, wherein the system further comprises:
   a reader that is configured to output an identifier of the item based at least in part on the item being received at the workstation; and
   an optical device that is configured to output an image of the item based at least in part on the item being received at the workstation,
   wherein the execution of the computer-readable instructions further configures the system to:
      receive the identifier and the image of the item;
      retrieve, based at least in part on identifier, textual description of the item from a data store;
      generate the second input by including the textual description and the image in the second input;
      provide the second input to the machine learning model;
      determine another output of the machine learning model based at least in part on the second input, the other output indicating at least one of: a damage likelihood for using the package type or the package decision; and
      cause the item to be packaged at the workstation according to the package type.

6. The system of claim 5, wherein causing the item to be packaged comprises outputting, to the workstation, an indication about the package type, wherein the indication controls an automatic packaging by the workstation of the item in the package.

7. A method implemented by a computer system that hosts a predictive model, the method comprising:
   receiving first item data from a workstation, the first item data comprising a description of an item, the workstation configured to facilitate packaging of the item;
   generating, based at least in part on the first item data, an input to the predictive model, the predictive model trained based at least in part on batches of training data to generate outputs about package decisions, the training data excluding the first item data and including second item data, packaging data, and damage data associated with a different item;
   generating, based at least in part on an output of the predictive model, a package decision indicating a package type associated with the packaging of the item; and
   sending, to the workstation, the package decision, wherein the predictive model is iteratively trained by using batches of training data and a loss function, wherein the training comprises:
      receiving a batch of training data associated with packaged items, the batch comprising item descriptions and item images of the packaged items;
      determining actual package types and observed damages associated with the packaged items;
      generating information based at least in part on the item description, the item images, the package types, and the observed damages; and
      iteratively inputting the information to the predictive model to generate predicted package decisions, update the loss function, and update parameters of predictive model based on the loss functionswherein the loss function is updated based at least in part on a training output of the predictive model indicating a predicted package type and a predicted damage for using the predicted package type, a first comparison of the predicted package type to an actual package type, and a second comparison of the predicted damage to an observed damage due to using the actual package type.

8. The method of claim 7, further comprising:
   accessing the training data indicating package types and damages associated with the package types; and
   training the predictive model based at least in part on the training data.

9. The method of claim 8, wherein a damage of the damages corresponds to a previous delivery of a different item and is determined by at least:
   determining an order associated with the previous delivery; and
   determining a review associated with the order and received from a user device after the previous delivery, the review indicating the damage.

10. The method of claim 8, further comprising:
   accessing at least one of historical fulfillment data associated with the damages, customer data associated with the damages, or condition data associated with the damages, wherein the training data comprises at least one of the historical fulfillment data, the customer data, or the condition data.

11. The method of claim 7, further comprising:
   receiving, as the output of the predictive model, a likelihood of damage per available package type; and
   selecting the package type based at least in part on a corresponding likelihood of damage.

12. The method of claim 11, further comprising:
   comparing the corresponding likelihood of damage to a threshold, wherein the package type is selected based at least in part on an outcome of the comparison.

13. The method of claim 12, further comprising:
   setting the threshold based at least in part on one or more of: the first item data, fulfillment data associated with a fulfillment of an order of a customer for the item, customer data associated with the customer, or condition data associated with the fulfillment or the customer.

14. The method of claim 7, further comprising:
   receiving, as the output of the predictive model, a likelihood of damage per available package type;
   determining a likely cost for the package type based at least in part on a corresponding likelihood of damage and on a set of optimization parameters; and
   selecting the package type based at least in part on the likely cost.

15. One or more non-transitory computer readable media storing instructions, that upon execution on a computer system hosting a predictive model, cause the computer system to perform operations comprising:

receiving first item data from a workstation, the first item data comprising a description of an item, the workstation configured to facilitate packaging of the item;

generating, based at least in part on the first item data, an input to the predictive model, the predictive model trained based at least in part on damage data associated with packaging items to generate outputs about package decisions;

generating, based at least in part on an output of the predictive model, a package decision indicating a package type associated with the packaging of the item; and sending, to the workstation, the package decision, the workstation configured to package the item in a package corresponding to the package type, wherein the predictive model comprises at least one of a deep neural network, a convolutional neural network, a recursive neural network, or a reinforcement learning model and is iteratively trained by using batches of training data and a loss function, wherein the training comprises:

receiving a batch of training data associated with packaged items, the batch comprising item descriptions and item images of the packaged items;

determining actual package types and observed damages associated with the packaged items;

generating information based at least in part on the item description, the item images, the package types, and the observed damages; and iteratively inputting the information to the predictive model to generate predicted package decisions, update the loss function, and update parameters of predictive model based on the loss functions wherein the loss function is updated based at least in part on a training output of the predictive model indicating a predicted package type and a predicted damage for using the predicted package type, a first comparison of the predicted package type to an actual package type, and a second comparison of the predicted damage to an observed damage due to using the actual package type.

16. The one or more non-transitory computer readable media of claim 15, further storing first additional instructions, that upon execution on the computer system, cause the computer system to perform first additional operations comprising:

receiving, as the output of the predictive model, a likelihood of damage corresponding to the package type.

17. The one or more non-transitory computer readable media of claim 16, further storing second additional instructions, that upon execution on the computer system, cause the computer system to perform second additional operations comprising:

selecting the package type from available package types based at least in part on the likelihood of damage and a set of optimization parameters, wherein the set comprises at least one of: a labor cost, a consumable cost, a fulfillment cost, a predicted customer negative value action cost, a customer concession cost, or a carbon cost.

18. The one or more non-transitory computer readable media of claim 17, wherein the package type is selected by:

determining a likely cost based at least in part on the likelihood of the damage and the set of optimization parameters; and comparing the likely cost to a second likely cost of a second package type associated with a second likelihood of damage.

19. The one or more non-transitory computer readable media of claim 15, wherein the package type is received as the output of the predictive model.

20. The one or more non-transitory computer readable media of claim 15, wherein the first item data is received based at least in part on a scan of the item at the workstation or user input at the workstation indicating that the item is to be packaged, and wherein the package decision is sent to the workstation prior to the packaging of the item at the workstation and causes the item to be packaged according to the package decision.

* * * * *